May 21, 1935.  L. S. MAEDE  2,002,094
APPARATUS FOR ROASTING COFFEE
Original Filed Nov. 25, 1930  3 Sheets-Sheet 1
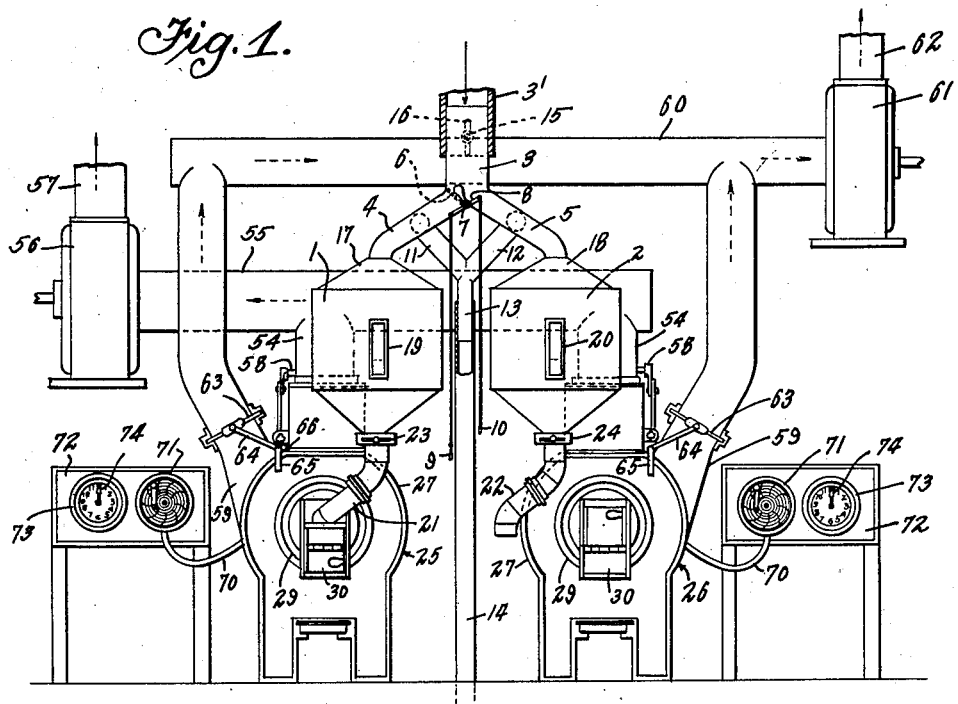
Fig. 1.
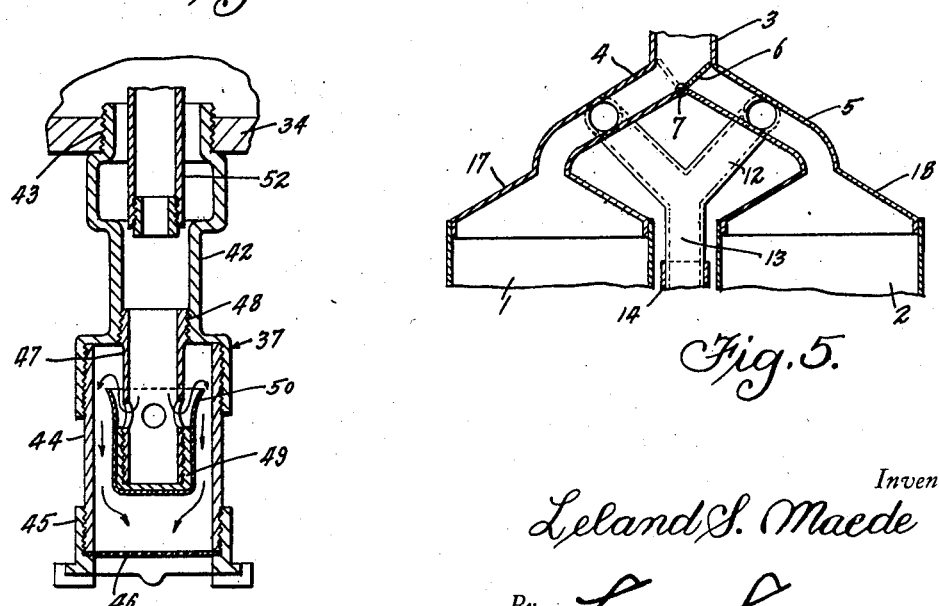
Fig. 4.
Fig. 5.
Inventor
Leland S. Maede
By Lyon & Lyon
Attorneys May 21, 1935.  L. S. MAEDE  2,002,094
APPARATUS FOR ROASTING COFFEE
Original Filed Nov. 25, 1930   3 Sheets-Sheet 2

Inventor
Leland S. Maede
By Lyon & Lyon
Attorneys

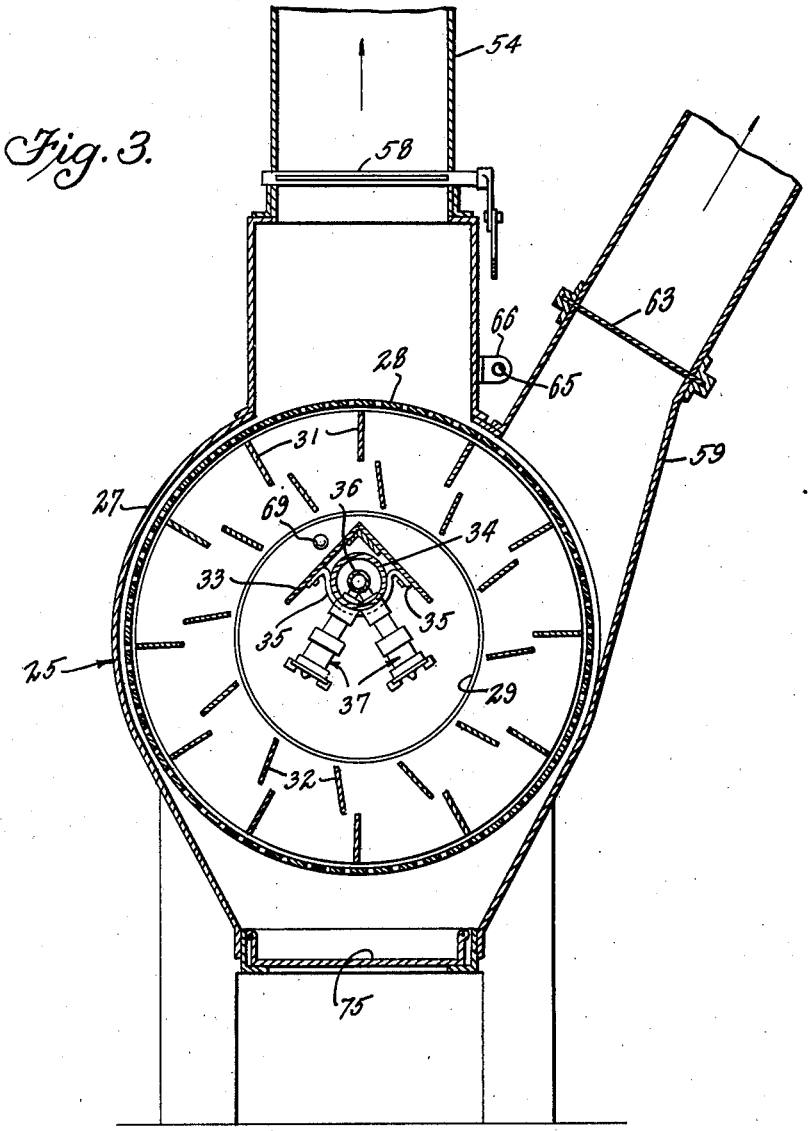

Patented May 21, 1935

2,002,094

UNITED STATES PATENT OFFICE 2,002,094

APPARATUS FOR ROASTING COFFEE

Leland S. Maede, Brooklyn, N. Y.

Original application November 25, 1930, Serial No. 498,064. Divided and this application November 7, 1932, Serial No. 641,622

2 Claims. (Cl. 34—5)

This invention relates to improvements in apparatus for roasting coffee whereby uniform coffee of optimum flavor may be produced from green coffee beans without the loss of volatile, aromatic and flavoring constituents. This application for Letters Patent is a division of application Serial No. 498,064 filed November 25, 1930, which has matured into Patent No. 1,911,763.

Heretofore, roasting of coffee consisted in subjecting raw coffee beans to heat, the application of heat being stopped when the coffee beans (originally a green color) assumed a desired shade of brown. The change in color during the last few minutes of roasting is extremely rapid, and the time consumed in removing a sample and visually observing the color was sufficient to permit the roasting of the major portion of the coffee to be carried beyond a required or desirable point, so that when the beans were discharged from the roaster into a cooling tray, they had been over-roasted and the optimum color and flavor of the coffee had been lost. For this reason, the roasting was generally carried on slowly so as to permit visual examination, with a reasonable time permitted for inspections.

Ordinarily, the coffee was roasted, that is, brought up to the required temperature condition, in from about 20 to 30 minutes from the time it was placed in the roaster and the heating started. This slow roasting method has the disadvantage of reducing the bulk and causing a shrinkage of the coffee beans to take place. Even after the beans were discharged from the roaster in a properly roasted condition, there was great tendency to produce an over-roasted coffee, inasmuch as the beans in the cooling tray continued to roast by reason of their contained heat. Actually, the beans very often burned because of their contained heat and by reason of the abundance of oxygen.

This over-roasting or after-roasting is particularly true of beans in the center of the body of beans in the tray. In order to obviate this over or after-roasting, some manufacturers have hitherto sprayed the beans, as they are discharged from the roaster, with cold water. This water-cooling treatment, however, had the disadvantage of extracting volatile flavoring and aromatic constituents from the beans, the water forming steam as it struck the hot beans and thus in substance subjecting the beans to steam distillation.

The most highly desirable constituents were thus removed by a form of steam distillation from the coffee. Furthermore, the water when applied in excess (as was necessary to stop the beans from over or after-roasting) was absorbed in the coffee, making it water logged and adding false weight.

The method of the invention of the parent application, of which this is a division, consists in applying heat to green coffee beans in such quantity as to bring the beans up to a high temperature of about 400° F., in not more than about 11 to 13 minutes, while maintaining the beans in motion, and then checking the roasting almost instantaneously by discontinuing the application of heat and subjecting the moving beans to a forcible current of cool air.

The rapid roast conducted in accordance with this invention prevents the distillation of aromatic and flavoring constituents during the roasting; it reduces the loss by shrinkage of the beans. The sudden cooling effectively checks the rise in temperature of the beans and prevents over or after-roasting of the beans. The use of cool air obviates the disadvantages encountered when water is employed, as stated hereinabove.

The invention also relates to a particular arrangement of elements and improvements in the construction of roasters, by means of which the method of this invention may be carried out with particular effectiveness.

In describing the invention, reference will be had to the appended drawings, in which:

Fig. 1 is a front elevation of a form of roasting and cooling apparatus in which the method of this invention may be carried out.

Fig. 3 is a transverse vertical section through the roasting cylinder shown in Figs. 1 and 2.

Fig. 4 is an enlarged longitudinal section through one of the burners illustrated in Figs. 2 and 3.

Fig. 5 is a vertical section through a portion of the system shown in Fig. 1.

Figure 2:
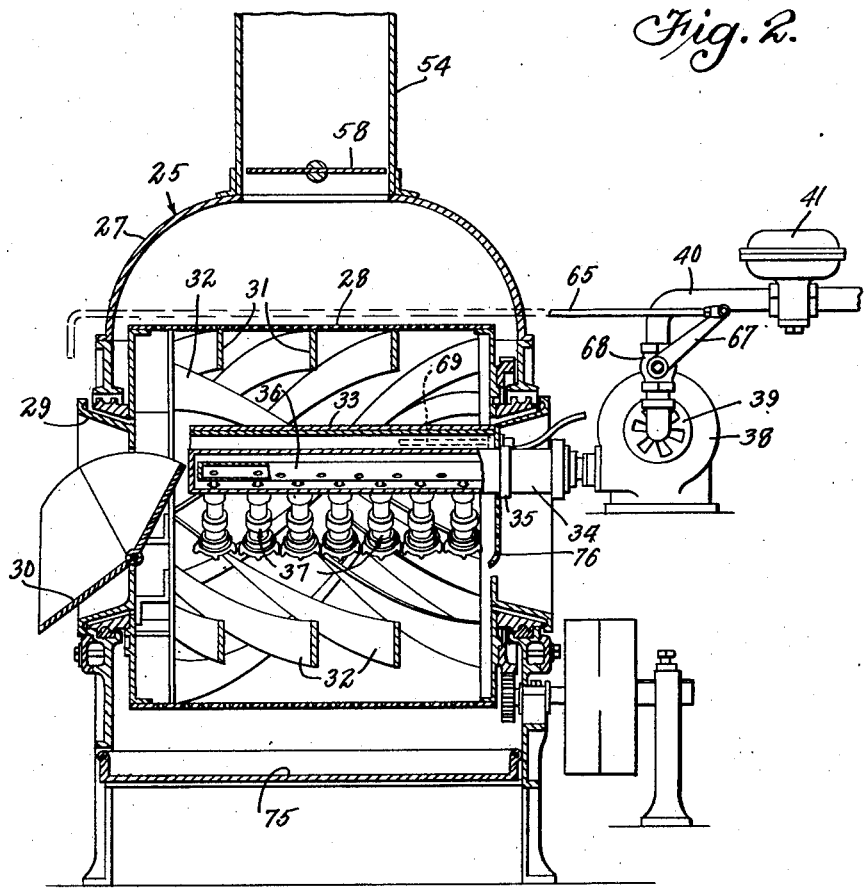
Fig. 2 is a vertical longitudinal section through one of the roasting and cooling cylinders shown in Fig. 1.

The apparatus shown in Fig. 1 may comprise measuring bins 1 and 2 to which the green coffee may be supplied from a conduit 3. Branch conduits 4 and 5 may lead to the upper portions of measuring bins 1 and 2. A flop valve 6 may be positioned at that point in conduit 3 where such conduit separates into branch lines 4 and 5. The flop valve 6 is mounted on a pin 7 and a cross piece 8 is connected to the pin 7 exteriorly of the conduits 4 and 5. Operating handles 9 and 10 may be connected to the opposite ends of the cross arm 8, thereby permitting the valve to be selectively operated.

Branch conduits 11 and 12 may lead from the conduits 4 and 5 to a common downwardly extended conduit 13, such branch conduits 11 and 12 and conduit 13 being adapted to remove any excess of coffee supplied to the measuring bins 1 and 2. The conduit 13 may be slidably mounted within a continuation 14 of such conduit, and the conduit 3 may be slidably and adjustably connected to a stationary portion 3' of such conduit. The movable portion 3 may be provided with threaded shafts having turn buckles 15 thereon, the shafts passing through vertical slits 16 in the stationary portion 3' of the conduit.

The branch lines 4 and 5 may be firmly connected to conical tops 17 and 18, such conical tops slidably fitting within the measuring bins 1 and 2. The measuring bins 1 and 2 may be provided with windows 19 and 20, through which the level of the coffee within the measuring bins 1 and 2 may be observed. The lower portions of the measuring bins 1 and 2 may also be of conical shape and terminate in flexible conduits 21 and 22, valves 23 and 24 being positioned in such conduits to regulate the flow of coffee therethrough. Preferably, the measuring bins 1 and 2 are above the roasting cylinders 25 and 26.

The roasting cylinders generally indicated at 25 and 26 comprise a housing 27 in which a perforated cylindrical roasting cylinder 28 is journaled. The specific construction of the housing cylinder 28 and the bearings need not be described here, inasmuch as the particular embodiment of the roasting cylinder shown in these drawings is similar to the roasting cylinder shown in Patents Nos. 1,128,101 and 1,532,574 issued to Robert Burns. Suffice it to say that the front opening 29 is stationary with the housing 27 and includes a swinging door 30 through which coffee may be either supplied to the cylinder 28 or discharged therefrom, depending upon the position of the door.

As shown in Fig. 2, the door is in the discharge position within the cylinder. The perforated housing 28 has a plurality of baffles 31 and 32 adapted to thoroughly agitate the coffee. Extending substantially axially into the cylinder 28 there is provided an annular hood 33. Beneath the hood 33 there extends a pipe 34 attached to the hood 33 as by means of straps 35. Centrally within the pipe 34 may be another pipe 36, the pipe 34 merely acting as a support for a plurality of burners generally indicated at 37, such burners extending downwardly in two rows and directed angularly against the coffee within the cylinder 28.

The pipe 36 may lead to a pressure fan and mixer 38 provided with regulatable air inlet means 39 and with a pipe means 40 leading to a source of gaseous fuel. A pressure-controlling valve 41 may be positioned in the line 40 so as to maintain the pressure of the gas supply substantially constant. A quick-acting valve 68 may also be positioned in the line 40 and between the pressure-regulating valve 41 and the mixer fan 38.

It is to be understood that the mixer fan 38 may be suitably driven by means not shown, so as to suck in the required amount of air through the regulatable openings 39 and mix the same thoroughly with the gaseous fuel before it is discharged into the line 36.

The burner 37 may comprise an outer casing 42 threadedly connected to the outer pipe 34 as indicated at 43. The lower end of casing 42 may be enlarged and be threadedly connected to a cylindrical member 44 which is adapted to receive a collar 45. A metallic grid or perforated plate 46 may be carried between the cylindrical member 44 and the collar 45.

Within the cylindrical member 44 there is supported a tubular member 47 threadedly connected to the narrow portion of the housing 42, as by means of threads indicated at 48. The tubular member 47 may be provided with a cap or plug 49 having a rearwardly extending and outwardly directed fin 50. Openings 51 may be formed in the tubular member 47, said openings being partially covered by the fin 50 carried by the cap 39.

A mixture of gas and air from the line 36 is admitted to the burner by means of a pipe connection 52 extending into the housing 42, said pipe connection 52 being threadedly connected to the pipe 36. The mixture of gas and air, therefore, passes through the supply line 36 into the pipe means 52 and into the tubular member 47, from which it is discharged through the openings 51 and deflected rearwardly by the fins 50. Within the cylindrical member 44 the mixture of gas and air is blown outwardly through the grid 46. This particular construction thoroughly mixes the gaseous fuel with the air so as to permit large quantities of gas under pressure to be burned with great rapidity and without the tendency for the flame to flare back into the supply lines 36 and 52.

The burners 37 are preferably disposed in two angularly positioned rows, as indicated in Figs. 2 and 3. The flame produced by these burners is short but of wide area.

Extending upwardly from the housings 27 are conduits 54 leading to a main 55 in which a suction fan 56 is located, said suction fan discharging the gases through a line 57 into a suitable stack or in the atmosphere. Dampers 58 may be positioned in the conduits 54. In addition, branch conduits 59 may extend from the housings 27, said conduits 59 leading to a main 60 connected to the inlet end of a suction fan 61 adapted to discharge the gases through conduit 62 into a suitable stack or into the atmosphere.

Sliding valves 63 may be positioned in the conduits 59, said valves 63 being operably connected, as by means of a rod 64 connected to the handle 65, said handle 65 being slidably carried in hangers 66 attached to a portion of the housings 27 or the conduits 54. The handle 65 may be connected as by means of the arm 67 with the valve 68. Operation of the handle 65 will therefore close the valve 68 and simultaneously open the valve 63.

Positioned above the angular deflector plate 33 within the rotatable perforated cylinder 28 there is a thermocouple 69, said thermocouple being connected by suitable wires, indicated at 70, with a recording thermometer 71 positioned on a suitable instrument board 72 adjoining the roasters 25 and 26.

The instrument board or panel 72 may also include a large time-indicating device 73, said time-indicating device having a movable handle or arm 74 adapted to cooperate with a dial marked in the customary twelve increments, said arm 74 being actuated by suitable clockwork so that the arm performs a complete revolution in twelve minutes. The purpose of this particular time-indicating instrument 73 will become apparent from the subsequent description of the operation of the apparatus described hereinabove.

The arrangement particularly described hereinabove permits almost a continuous operation, the two roasters 25 and 26 being operative alternately. The properly blended, green coffee is admitted into the measuring bins, such as for example the bin 2, by turning the flop valve 6 into the desired position. The bin 2 is filled up to the level of the branch line 12, excess coffee being then sent into the branch line 12 by line 13 and line 14 into a suitable storage bin.

The volume of coffee within the measuring bin 2 is thus established by the height of the cone 18, line 5 and particularly the opening between branch line 12 and the conduit 5 above the valve 24 of the measuring bin.

It is to be understood that the measuring bins 2 are stationary and only the top conical portions and the conduits 5 are movable.

In discharging coffee from the measuring bins into the roaster, the level of coffee is watched through the windows 19 and 20, and when the level of the coffee within the bin 2 reaches a predetermined point visible through the windows 19 and 20, the supply of coffee to the roaster is discontinued by closing the valves 23 and 24. The volume of coffee above such predetermined lowest level and the outlet or port communicating with the branch lines 11 and 12 determines the volume of coffee fed into the roaster. This volume may be changed by adjusting the height of the conical tops 17 and 18, branch lines 4 and 5, conduit 3, branch lines 11 and 12 and the line 13 as by means of the thumb screw arrangement indicated at 15.

It is to be understood that when coffee is being discharged from the measuring bins 1 and 2 into the roaster, the flop valve is so positioned as to prevent additional new coffee from being supplied to the bin from which coffee is being withdrawn into the roaster. By accurately measuring the volume of coffee supplied to the roaster, the quality of the coffee may be more effectively controlled during the roasting.

In actual operation, the burners 37 are ignited and the cylinder 28 rotated by suitable means. The predetermined volume of coffee is then discharged through the swinging spout 21 or 22 into the roaster. The handle 65 is, of course, in the depressed position as shown in Fig. 2, in which position the valve 68 is open, supplying gaseous fuel to the supply line 36. The valve 63 is also closed.

When the coffee is first charged into the roaster, the handle 74 of the time-indicating device 73 is preferably in the zero or "12" position. The roasting is allowed to take place for a predetermined length of time, say twelve and a half minutes, and the temperature as indicated by the recording device 71 carefully watched.

It has been found that all coffees roasted in accordance with this method may be roasted in from eleven to thirteen minutes, and preferably twelve minutes, and that the maximum to which the coffee is acutally raised in this period of time should be from about 390° F. to 405° F. with an average of 400° F.

It is to be understood that the temperatures mentioned herein are not the flame temperatures, but actually the temperatures of the coffee. For this reason the thermocouple 69 is positioned above the deflector plate 33 and it contacts with the coffee as it is raised up and above the deflector by the vanes 31 and 32. In other words, the temperature of the coffee is coordinated with the time or period of roasting, and if it is seen that the coffee does not reach 400° F. in twelve minutes, then the pressure regulating valve 41 is adjusted so as to increase the pressure of gas supplied to the supply line 36, thereby permitting a more intense heating to take place.

As soon as twelve minutes have elapsed, the operator pulls handle 65, thereby discontinuing the application of heat by closing the valve 68 and simultaneously opening valve 63 in conduit 59. Conduit 59 is connected to the large suction fan 61 and large quantities of cool air are drawn through the roasting cylinder 28 while the coffee in such cylinder is being rotated so as to suddenly cool the coffee and prevent further roasting. The air may be drawn into the roasting cylinder 28 through the apertures around the door 30, through apertures near the bottom pan 75, and through the screen or perforated plate 76 in the rear central portion of the cylinder 28.

The rotation of the coffee and the application of suction is continued until the temperature recording instrument 71 indicates that the temperature of the coffee has dropped below about 200°, at which point the door 30 may be pivoted into discharge position and the coffee discharged from the roasting cylinder 28 into a suitable bin or tray, from whence it is taken to the grinding and packing machines.

The two roasting units 25 and 26 may be operated as described hereinabove alternately, unit 25 being on roast while the unit 26 is in the cooling stage.

By carrying out the roasting process as described hereinabove, namely, by regulating the volume of coffee supplied to the roasting cylinder, by intensely heating the coffee to a temperature of about 400° in a period of not exceeding thirteen minutes, and by suddenly checking the roasting of the coffee by the application of a current of cool air, the flavoring matter is retained in the coffee and the resulting coffee is of greater bulk than when methods such as those employed in the prior art are used.

Although a particular embodiment of the invention has been described in considerable detail, it is understood that this invention is not limited to the structural details herein shown but embraces all such changes and modifications as come within the scope of the appended claims.

I claim:

1. In a coffee roasting apparatus, the combination of a housing, a rotatable cylinder within said housing, a plurality of downwardly directed burners positioned within said cylinder, a fuel supply conduit leading to said burners, a valve in said fuel supply conduit, a port in said housing adjacent a longitudinal side of said cylinder, a conduit leading into said port, suction means operably connected to said conduit, a valve in said conduit, and means for operating both the fuel supply valve and suction conduit valve simultaneously whereby said fuel supply valve is closed and said suction valve is opened to rapidly pass a current of air directly through the walls of said cylinder.

2. A coffee roasting apparatus comprising the combination of a housing, a rotatable cylinder within said housing, a longitudinally directed burner support extending into said cylinder, a fuel supply conduit positioned within said support, a plurality of downwardly directed burners carried by said support within said cylinder, a plurality of fuel supply nozzles carried by said fuel conduit and extending into said burners, a valve in said fuel supply conduit, a port in said housing adjacent a longitudinal side of said cylinder and the conduit leading into said port, suction means operably connected to said conduit, a valve in said conduit, and means for operating both the fuel supply valve and suction conduit valve simultaneously whereby said fuel supply valve is closed and said suction valve is opened simultaneously to rapidly pass a current of air directly through the walls of said cylinder.

LELAND S. MAEDE.